United States Patent
Colley et al.

(10) Patent No.: US 7,296,275 B2
(45) Date of Patent: Nov. 13, 2007

(54) METHOD AND SYSTEM FOR PASSING OBJECTS IN A DISTRIBUTED SYSTEM USING SERIALIZATION CONTEXTS

(75) Inventors: Adrian E. Colley, Arlington, MA (US); Peter C. Jones, Winchester, MA (US); Robert W. Schiefler, Somerville, MA (US); Michael P. Warres, Cambridge, MA (US); Ann M. Wollrath, Groton, MA (US)

(73) Assignee: Sun Microsystems, Inc., Menlo Park, CA (US)

( * ) Notice: Subject to any disclaimer, the term of this patent is extended or adjusted under 35 U.S.C. 154(b) by 886 days.

(21) Appl. No.: 09/753,686

(22) Filed: Jan. 4, 2001

(65) Prior Publication Data

US 2002/0124118 A1    Sep. 5, 2002

(51) Int. Cl.
*G06F 9/46* (2006.01)
(52) U.S. Cl. .................................. 719/316; 719/330
(58) Field of Classification Search ........ 709/201–203; 719/310, 330, 311–316; 718/1, 100
See application file for complete search history.

(56) References Cited

U.S. PATENT DOCUMENTS

| | | | |
|---|---|---|---|
| 4,430,699 A | 2/1984 | Segarra et al. |
| 4,491,946 A | 1/1985 | Kryskow, Jr. et al. |
| 4,558,413 A | 12/1985 | Schmidt et al. |
| 4,567,359 A | 1/1986 | Lockwood |
| 4,713,806 A | 12/1987 | Oberlander et al. |
| 4,800,488 A | 1/1989 | Agrawal et al. |
| 4,809,160 A | 2/1989 | Mahon et al. |
| 4,819,233 A | 4/1989 | Delucia et al. |
| 4,823,122 A | 4/1989 | Mann et al. |
| 4,939,638 A | 7/1990 | Stephenson et al. |
| 4,956,773 A | 9/1990 | Saito et al. |
| 4,992,940 A | 2/1991 | Dworkin |
| 5,088,036 A | 2/1992 | Ellis et al. |
| 5,101,346 A | 3/1992 | Ohtsuki |
| 5,109,486 A | 4/1992 | Seymour |
| 5,187,787 A | 2/1993 | Skeen et al. |
| 5,218,699 A | 6/1993 | Brandle et al. |
| 5,253,165 A | 10/1993 | Leiseca et al. |
| 5,257,369 A | 10/1993 | Skeen et al. |

(Continued)

FOREIGN PATENT DOCUMENTS

EP    0 300 516 A2    1/1989

(Continued)

OTHER PUBLICATIONS

Amitabh, D., et al., Proxies, Application Interfaces, and Distributed Systems, IEEE, pp. 212-220, 1992.

(Continued)

*Primary Examiner*—Van H. Nguyen
(74) *Attorney, Agent, or Firm*—Finnegan, Henderson, Farabow, Garrett & Dunner, LLP

(57) ABSTRACT

A system consistent with the present invention reduces the number of redundant class descriptors that are sent during remote method calls by using serialization contexts. "Serialization contexts" are dictionary objects that map a class descriptor to a corresponding integer handle. When possible, the integer handle, rather than the full class descriptor, is passed, saving processing time in RMI calls.

13 Claims, 5 Drawing Sheets

U.S. PATENT DOCUMENTS

| | | |
|---|---|---|
| 5,293,614 A | 3/1994 | Ferguson et al. |
| 5,297,283 A | 3/1994 | Kelly, Jr. et al. |
| 5,303,042 A | 4/1994 | Lewis et al. |
| 5,307,490 A | 4/1994 | Davidson et al. |
| 5,311,591 A | 5/1994 | Fischer |
| 5,319,542 A | 6/1994 | King, Jr. et al. |
| 5,327,559 A | 7/1994 | Priven et al. |
| 5,339,430 A | 8/1994 | Lundin et al. |
| 5,339,435 A | 8/1994 | Lubkin et al. |
| 5,341,477 A | 8/1994 | Pitkin et al. |
| 5,386,568 A | 1/1995 | Wold et al. |
| 5,390,328 A | 2/1995 | Frey et al. |
| 5,392,280 A | 2/1995 | Zheng |
| 5,423,042 A | 6/1995 | Jalili et al. |
| 5,440,744 A | 8/1995 | Jacobson et al. |
| 5,446,901 A | 8/1995 | Owicki et al. |
| 5,448,740 A | 9/1995 | Kiri et al. |
| 5,452,459 A | 9/1995 | Drury et al. |
| 5,455,952 A | 10/1995 | Gjovaag |
| 5,459,837 A | 10/1995 | Caccavale |
| 5,471,629 A | 11/1995 | Risch |
| 5,475,792 A | 12/1995 | Stanford et al. |
| 5,475,817 A | 12/1995 | Waldo et al. |
| 5,475,840 A | 12/1995 | Nelson et al. |
| 5,481,721 A | 1/1996 | Serlet et al. |
| 5,491,791 A | 2/1996 | Glowny et al. |
| 5,504,921 A | 4/1996 | Dev et al. |
| 5,506,984 A | 4/1996 | Miller |
| 5,511,196 A | 4/1996 | Shackelford et al. |
| 5,511,197 A | 4/1996 | Hill et al. |
| 5,524,244 A | 6/1996 | Robinson et al. |
| 5,544,040 A | 8/1996 | Gerbaulet |
| 5,548,724 A | 8/1996 | Akizawa et al. |
| 5,548,726 A | 8/1996 | Pettus |
| 5,553,282 A | 9/1996 | Parrish et al. |
| 5,555,367 A | 9/1996 | Premerlani et al. |
| 5,555,427 A | 9/1996 | Aoe et al. |
| 5,557,798 A | 9/1996 | Skeen et al. |
| 5,560,003 A | 9/1996 | Nilsen et al. |
| 5,561,785 A | 10/1996 | Blandy et al. |
| 5,577,231 A | 11/1996 | Scalzi et al. |
| 5,592,375 A | 1/1997 | Salmon et al. |
| 5,594,921 A | 1/1997 | Pettus |
| 5,603,031 A | 2/1997 | White et al. |
| 5,617,537 A | 4/1997 | Yamada et al. |
| 5,628,005 A | 5/1997 | Hurvig |
| 5,640,564 A | 6/1997 | Hamilton et al. |
| 5,644,720 A | 7/1997 | Boll et al. |
| 5,644,768 A | 7/1997 | Periwal et al. |
| 5,652,888 A | 7/1997 | Burgess |
| 5,655,148 A | 8/1997 | Richman et al. |
| 5,659,751 A | 8/1997 | Heninger |
| 5,664,110 A | 9/1997 | Green et al. |
| 5,664,111 A | 9/1997 | Nahan et al. |
| 5,664,191 A | 9/1997 | Davidson et al. |
| 5,666,493 A | 9/1997 | Wojcik et al. |
| 5,671,225 A | 9/1997 | Hooper et al. |
| 5,671,279 A | 9/1997 | Elgamal |
| 5,675,796 A | 10/1997 | Hodges et al. |
| 5,675,797 A | 10/1997 | Chung et al. |
| 5,680,573 A | 10/1997 | Rubin et al. |
| 5,680,617 A | 10/1997 | Gough et al. |
| 5,682,534 A | 10/1997 | Kapoor et al. |
| 5,684,955 A | 11/1997 | Meyer et al. |
| 5,689,709 A | 11/1997 | Corbett et al. |
| 5,694,551 A | 12/1997 | Doyle et al. |
| 5,706,435 A | 1/1998 | Barbara et al. |
| 5,706,502 A | 1/1998 | Foley et al. |
| 5,710,887 A | 1/1998 | Chelliah et al. |
| 5,715,314 A | 2/1998 | Payne et al. |
| 5,721,825 A | 2/1998 | Lawson et al. |
| 5,721,832 A | 2/1998 | Westrope et al. |
| 5,724,540 A | 3/1998 | Kametani |
| 5,724,588 A | 3/1998 | Hill et al. |
| 5,727,048 A | 3/1998 | Hiroshima et al. |
| 5,727,145 A | 3/1998 | Nessett et al. |
| 5,729,594 A | 3/1998 | Klingman |
| 5,737,607 A | 4/1998 | Hamilton et al. |
| 5,742,768 A | 4/1998 | Gennaro et al. |
| 5,745,678 A | 4/1998 | Herzberg et al. |
| 5,745,695 A | 4/1998 | Gilchrist et al. |
| 5,745,703 A | 4/1998 | Cejtin et al. |
| 5,745,755 A | 4/1998 | Covey |
| 5,748,897 A | 5/1998 | Katiyar |
| 5,754,849 A | 5/1998 | Dyer et al. |
| 5,754,977 A | 5/1998 | Gardner et al. |
| 5,757,925 A | 5/1998 | Faybishenko |
| 5,758,077 A | 5/1998 | Danahy et al. |
| 5,758,328 A | 5/1998 | Giovannoli |
| 5,758,344 A | 5/1998 | Prasad et al. |
| 5,761,507 A | 6/1998 | Govett |
| 5,761,656 A | 6/1998 | Ben-Shachar |
| 5,764,897 A | 6/1998 | Khalidi |
| 5,764,915 A | 6/1998 | Heimsoth et al. |
| 5,764,982 A | 6/1998 | Madduri |
| 5,768,532 A | 6/1998 | Megerian |
| 5,774,551 A | 6/1998 | Wu et al. |
| 5,774,729 A | 6/1998 | Carney et al. |
| 5,778,179 A | 7/1998 | Kanai et al. |
| 5,778,187 A | 7/1998 | Monteiro et al. |
| 5,778,228 A | 7/1998 | Wei |
| 5,778,368 A | 7/1998 | Hogan et al. |
| 5,784,560 A | 7/1998 | Kingdon et al. |
| 5,787,425 A | 7/1998 | Bigus |
| 5,787,431 A | 7/1998 | Shaughnessy |
| 5,790,548 A | 8/1998 | Sistanizadeh et al. |
| 5,790,677 A | 8/1998 | Fox et al. |
| 5,794,207 A | 8/1998 | Walker et al. |
| 5,799,173 A | 8/1998 | Gossler et al. |
| 5,802,367 A | 9/1998 | Held et al. |
| 5,805,805 A | 9/1998 | Civanlar et al. |
| 5,806,042 A | 9/1998 | Kelly et al. |
| 5,808,911 A | 9/1998 | Tucker et al. |
| 5,809,144 A | 9/1998 | Sirbu et al. |
| 5,809,507 A | 9/1998 | Cavanaugh, III |
| 5,812,819 A | 9/1998 | Rodwin et al. |
| 5,813,013 A | 9/1998 | Shakib et al. |
| 5,815,149 A | 9/1998 | Mutschler, III et al. |
| 5,815,709 A | 9/1998 | Waldo et al. |
| 5,815,711 A | 9/1998 | Sakamoto et al. |
| 5,818,448 A | 10/1998 | Katiyar |
| 5,829,022 A | 10/1998 | Watanabe et al. |
| 5,832,219 A | 11/1998 | Pettus |
| 5,832,529 A | 11/1998 | Wollrath et al. |
| 5,832,593 A | 11/1998 | Wurst et al. |
| 5,835,737 A | 11/1998 | Sand et al. |
| 5,842,018 A | 11/1998 | Atkinson et al. |
| 5,844,553 A | 12/1998 | Hao et al. |
| 5,845,090 A | 12/1998 | Collins, III et al. |
| 5,845,129 A | 12/1998 | Wendorf et al. |
| 5,850,442 A | 12/1998 | Muftic |
| 5,860,004 A | 1/1999 | Fowlow et al. |
| 5,860,153 A | 1/1999 | Matena et al. |
| 5,864,862 A | 1/1999 | Kriens et al. |
| 5,864,866 A | 1/1999 | Henckel et al. |
| 5,872,928 A | 2/1999 | Lewis et al. |
| 5,872,973 A | 2/1999 | Mitchell et al. |
| 5,875,335 A | 2/1999 | Beard |
| 5,878,411 A | 3/1999 | Burroughs et al. |
| 5,884,024 A | 3/1999 | Lim et al. |
| 5,884,079 A | 3/1999 | Furusawa |
| 5,887,134 A | 3/1999 | Ebrahim |
| 5,889,951 A | 3/1999 | Lombardi |
| 5,890,158 A | 3/1999 | House et al. |

| | | |
|---|---|---|
| 5,892,904 A | 4/1999 | Atkinson et al. |
| 5,915,112 A | 6/1999 | Boutcher |
| 5,925,108 A | 7/1999 | Johnson et al. |
| 5,933,497 A | 8/1999 | Beetcher et al. |
| 5,933,647 A | 8/1999 | Aronberg et al. |
| 5,935,249 A | 8/1999 | Stern et al. |
| 5,940,827 A | 8/1999 | Hapner et al. |
| 5,944,793 A | 8/1999 | Islam et al. |
| 5,946,485 A | 8/1999 | Weeren et al. |
| 5,946,694 A | 8/1999 | Copeland et al. |
| 5,951,652 A | 9/1999 | Ingrassia, Jr. et al. |
| 5,956,509 A | 9/1999 | Kevner |
| 5,961,582 A | 10/1999 | Gaines |
| 5,963,924 A | 10/1999 | Williams et al. |
| 5,966,531 A | 10/1999 | Skeen et al. |
| 5,969,967 A | 10/1999 | Aahlad et al. |
| 5,974,201 A | 10/1999 | Chang et al. |
| 5,978,484 A | 11/1999 | Apperson et al. |
| 5,978,773 A | 11/1999 | Hudetz et al. |
| 5,982,773 A | 11/1999 | Nishimura et al. |
| 5,987,506 A | 11/1999 | Carter et al. |
| 5,991,808 A | 11/1999 | Broder et al. |
| 5,996,075 A | 11/1999 | Matena |
| 5,999,179 A | 12/1999 | Kekic et al. |
| 5,999,988 A | 12/1999 | Pelegri-Llopart et al. |
| 6,003,050 A | 12/1999 | Silver et al. |
| 6,003,065 A | 12/1999 | Yan et al. |
| 6,003,763 A | 12/1999 | Gallagher et al. |
| 6,009,103 A | 12/1999 | Woundy |
| 6,009,413 A | 12/1999 | Webber et al. |
| 6,009,464 A | 12/1999 | Hamilton et al. |
| 6,014,686 A | 1/2000 | Elnozahy et al. |
| 6,016,496 A | 1/2000 | Roberson |
| 6,016,516 A | 1/2000 | Horikiri |
| 6,018,619 A | 1/2000 | Allard et al. |
| 6,023,586 A | 2/2000 | Gaisford et al. |
| 6,026,414 A | 2/2000 | Anglin |
| 6,031,977 A | 2/2000 | Pettus |
| 6,032,151 A | 2/2000 | Arnold et al. |
| 6,034,925 A | 3/2000 | Wehmeyer |
| 6,044,381 A | 3/2000 | Boothby et al. |
| 6,052,761 A | 4/2000 | Hornung et al. |
| 6,055,562 A | 4/2000 | Devarakonda et al. |
| 6,058,381 A | 5/2000 | Nelson |
| 6,058,383 A | 5/2000 | Narasimhalu et al. |
| 6,061,699 A | 5/2000 | DiCecco et al. |
| 6,067,575 A | 5/2000 | McManis et al. |
| 6,078,655 A | 6/2000 | Fahrer et al. |
| 6,085,255 A | 7/2000 | Vincent et al. |
| 6,092,194 A | 7/2000 | Touboul |
| 6,093,216 A | 7/2000 | Adl-Tabatabai et al. |
| 6,101,528 A | 8/2000 | Butt |
| 6,104,716 A | 8/2000 | Crichton et al. |
| 6,108,346 A | 8/2000 | Doucette et al. |
| 6,134,603 A | 10/2000 | Jones et al. |
| 6,154,844 A | 11/2000 | Touboul et al. |
| 6,157,960 A | 12/2000 | Kaminsky et al. |
| 6,182,083 B1 | 1/2001 | Scheifler et al. |
| 6,185,602 B1 | 2/2001 | Bayrakeri |
| 6,185,611 B1 | 2/2001 | Waldo et al. |
| 6,189,046 B1 | 2/2001 | Moore et al. |
| 6,192,044 B1 | 2/2001 | Mack |
| 6,199,068 B1 | 3/2001 | Carpenter |
| 6,199,116 B1 | 3/2001 | May et al. |
| 6,212,578 B1 | 4/2001 | Racicot et al. |
| 6,216,158 B1 | 4/2001 | Luo et al. |
| 6,219,675 B1 | 4/2001 | Pal et al. |
| 6,226,746 B1 | 5/2001 | Scheifler |
| 6,243,716 B1 | 6/2001 | Waldo et al. |
| 6,243,814 B1 | 6/2001 | Matena |
| 6,247,091 B1 | 6/2001 | Lovett |
| 6,253,256 B1 | 6/2001 | Wollrath et al. |
| 6,263,350 B1 | 7/2001 | Wollrath et al. |
| 6,263,379 B1 | 7/2001 | Atkinson et al. |
| 6,272,559 B1 | 8/2001 | Jones et al. |
| 6,282,295 B1 | 8/2001 | Young et al. |
| 6,282,568 B1 | 8/2001 | Sondur et al. |
| 6,282,581 B1 | 8/2001 | Moore et al. |
| 6,292,934 B1 | 9/2001 | Davidson et al. |
| 6,301,613 B1 | 10/2001 | Ahlstrom et al. |
| 6,321,275 B1 * | 11/2001 | McQuistan et al. ......... 719/330 |
| 6,327,677 B1 | 12/2001 | Garg et al. |
| 6,339,783 B1 | 1/2002 | Horikiri |
| 6,343,308 B1 | 1/2002 | Marchesseault |
| 6,351,735 B1 | 2/2002 | Deaton et al. |
| 6,360,266 B1 | 3/2002 | Pettus |
| 6,363,409 B1 | 3/2002 | Hart et al. |
| 6,385,643 B1 | 5/2002 | Jacobs et al. |
| 6,408,342 B1 | 6/2002 | Moore et al. |
| 6,418,468 B1 | 7/2002 | Ahlstrom et al. |
| 6,564,174 B1 | 5/2003 | Ding et al. |
| 6,578,074 B1 | 6/2003 | Bahlmann |
| 6,603,772 B1 | 8/2003 | Moussavi et al. |
| 6,604,127 B2 | 8/2003 | Murphy et al. |
| 6,604,140 B1 | 8/2003 | Beck et al. |
| 6,654,793 B1 | 11/2003 | Wollrath et al. |
| 6,704,803 B2 | 3/2004 | Wilson et al. |
| 6,757,262 B1 | 6/2004 | Weisshaar et al. |
| 6,757,729 B1 | 6/2004 | Devarakonda et al. |
| 6,801,940 B1 | 10/2004 | Moran et al. |
| 6,801,949 B1 | 10/2004 | Bruck et al. |
| 6,804,711 B1 | 10/2004 | Dugan et al. |
| 2001/0011350 A1 | 8/2001 | Zabetian |
| 2002/0059212 A1 | 5/2002 | Takagi |
| 2002/0073019 A1 | 6/2002 | Deaton |
| 2002/0111814 A1 | 8/2002 | Barnett et al. |
| 2003/0005132 A1 | 1/2003 | Nguyen et al. |
| 2003/0084204 A1 | 5/2003 | Wollrath et al. |
| 2003/0191842 A1 | 10/2003 | Murphy et al. |
| 2003/0191984 A1 | 10/2003 | Flaherty et al. |

FOREIGN PATENT DOCUMENTS

| | | |
|---|---|---|
| EP | 0 351 536 A3 | 1/1990 |
| EP | 0 384 339 A3 | 8/1990 |
| EP | 0 472 874 A1 | 3/1992 |
| EP | 0 474 340 A2 | 3/1992 |
| EP | 497 022 A1 | 8/1992 |
| EP | 0 555 997 A2 | 8/1993 |
| EP | 0 565 849 A2 | 10/1993 |
| EP | 0 569 195 A3 | 11/1993 |
| EP | 0 625 750 A2 | 11/1994 |
| EP | 0 635 792 A2 | 1/1995 |
| EP | 0 651 328 A1 | 5/1995 |
| EP | 0 660 231 A2 | 6/1995 |
| EP | 0 697 655 A2 | 2/1996 |
| EP | 0 718 761 A1 | 6/1996 |
| EP | 0 767 432 A2 | 4/1997 |
| EP | 0 778 520 A2 | 6/1997 |
| EP | 0 794 493 A2 | 9/1997 |
| EP | 0 803 810 A2 | 10/1997 |
| EP | 0 803 811 A2 | 10/1997 |
| EP | 0 805 393 A2 | 11/1997 |
| EP | 0 810 524 A1 | 12/1997 |
| EP | 0 817 020 A2 | 1/1998 |
| EP | 0 817 022 A2 | 1/1998 |
| EP | 0 817 025 A2 | 1/1998 |
| EP | 0 836 140 A2 | 4/1998 |
| GB | 2 253 079 A | 8/1992 |
| GB | 2 262 825 A | 6/1993 |
| GB | 2 305 087 A | 3/1997 |
| JP | 11-45187 | 2/1999 |
| WO | WO92/07335 | 4/1992 |
| WO | WO 92/09948 A1 | 6/1992 |
| WO | WO93/25962 A1 | 12/1993 |
| WO | WO 94/03855 | 2/1994 |

| | | |
|---|---|---|
| WO | WO 96/03692 | 2/1996 |
| WO | WO96/10787 | 4/1996 |
| WO | WO96/18947 | 6/1996 |
| WO | WO96/24099 | 8/1996 |
| WO | WO98/02814 | 1/1998 |
| WO | WO98/04971 | 2/1998 |
| WO | WO99/17194 | 4/1999 |
| WO | WO01/13228 A2 | 2/2001 |
| WO | WO01/86394 A2 | 11/2001 |
| WO | WO01/90903 A1 | 11/2001 |

OTHER PUBLICATIONS

Wollrath, A., et al., "Java-Centric Distributed Computing," IEEE Micro, pp. 44-53, 1997.
Wollrath et al., "JAVA-Centric Distributed Computing," IEEE Mirco May/Jun. 1997, pp. 44-53.
AUTO-ID Center, "Auto-ID Savant Specification 1.0," Version of Oct. 13, 2003 (58 pages).
H.A. Smith and J.D. McKeen, "Object-Oriented Technology: Getting Beyond the Hype," ACM, Spring 1996, vol. 27, pp. 20-29.
Java Remote Method Invocation Specification, JDK 1.1 FCS, Sun Microsystems, Inc. Feb. 1997, chapters 5 and 7.
Jennings, N.R. et al., "Using Intelligent Agents to Manage Business Processes," Dept. Electronic Engineering, Queen Mary & Westfield College, Mile End Road, London, E1 4NS, U.K., XP-002254546, 1996, 16 pages.
"Java (TM) Object Serialization Specification," Sun Microsystems, Inc., XP-002242372, <www.dei.estg.iplei.pt/P3/N/material/extra/serial-spec-JDK1_2.pdf>, Nov. 30, 1998 (76 pages).
Chan, P. et al., *The Java Class Libraries*, 2nd Edition, vol. 1, "Java.io ObjectInputStream," XP-002243027, pp. 1230-1232, 1262-1264, and 1283, Mar. 9, 1998 (7 pages).
Opyrchal et al., "Efficient Object Serialization in Java," Department of Electrical Engineering and Computer Science, University of Michigan, XP-002242373, May 31, 1999 (6 pages).
Osborn, "The Role of Polymorphism in Schema Evolution in an Object-Oriented Database," IEEE Transactions on Knowledge and Data Engineering, vol. 1, No. 3, Sep. 1989, pp. 310,317.
Kolodner et al., "Atomic Garbage Collection: Managing a Stable Heap," ACM, 1989, pp. 15-25.
"Consumers Can View, Share Picture On-Line as Kodak Picture Network Goes 'Live'," Business Wire, Aug. 25, 1997, pp. 18-19.
"ISN Dataweb Sells Software, Hardware," Datamation, Apr. 1, 1996, p. 40.
"Kodak DC220 And DC260 Digital Cameras Are Shipping To Retailers Across The Country Cameras Are Optimized for USB Interface Supported in Windows 98," Business Wire, Jun. 24, 1998, pp. 42-44.
"Kodak demonstrates leadership across entire photographic category," M2 Presswire, Feb. 13, 1998, pp. 31-35.
"Kodak PhotoNet Online Makes It a Snap to Share Summer Photos," PR Newswire, Jul. 2, 1998, pp. 63-64.
"Kodak Picture Network Sends Prints Home From the Holidays," Business Wire, Dec. 29, 1997, pp. 58-60.
"Photo processing made easy on the Internet; Storm Software and PictureVision team up with Konica Corp.," Business Wire, Feb. 22, 1996, pp. 3-4.
"Seeing your photos a whole new way," Business Wire, Dec. 12, 1996, pp. 9-10.
"Webwatch: MCI Announces Internet Access,", Boardwatch Magazine, Jan. 1995.
Administrator's Guide, Netscape Enterprise Server, Version 3.0, Netscape Communications Corp., 1998.
Bandrowski, "Stores Without Doors: Kiosks Generate New Profits," Corporate Computing, Oct. 1992, pp. 193-195.
Bruno, "Working the Web," Data Communications, Apr. 1997, pp. 50-60.
Cohen, "Electronic Commerce," USC/Information Sciences Institute, Oct. 1989.
Conhaim, "Online shopping: a beginner's guide; includes related listing of videotex services," Link-Up, vol. 5, No. 6, p. 32, Nov. 1988.

Design Project #2, Electronic Shopping at MIT, MIT Class 6.033 Handout 23, Massachusetts Institute of Technology, http://web.mit.edu/6.033/1995/handouts/html/h23.html, Spring 1995, pp. 1-6.
Ellsworth, "Boom Town," Internet World, Jun. 1995, pp. 33-35.
Estrin, "Inter-Organization Networks: Implications of Access Control Requirements for Interconnection Protocols," ACM, 1986, pp. 254-263.
Fleischer, "SkyMall's 'Supplier Network' Takes Flight", Retailtech, The Technology Magazine for Retail Executives, Apr. 1997.
Foley, "Managing Campus-Wide Information Systems: Issues and Problems," Capitalizing on Communication, ACM SIGUCCS XVII, 1989, pp. 169-174.
Fryxell, "eaasySABRE," Link-Up, May/Jun. 1996, pp. 10-11.
Gardner, "Kodak Follows Startup Into Online Photo Processing Business," Internet World, Sep. 8, 1997, pp. 5-6.
Gogan et al., "Open Market, Inc.: Managing in a Turbulent Environment," Harvard Business School Publishing, Aug. 29, 1996, pp. 1-30.
Israel et al., "Authentication in Office System Internetworks," ACM Transactions on Office Information Systems, vol. 1, No. 3, Jul. 1983, pp. 193-210.
Keller, "Smart Catalogs and Virtual Catalogs," Proceedings of the First USENIX Workshop of Electronic Commerce, USENIX Association, Jul. 11-12, 1995, pp. 125-131.
Klein et al., "TRADE'ex: The Stock Exchange of the Computer Industry," Harvard Business School Publishing, 1996, pp. 1-14.
Kodak PHOTONET FAQ, PhotoNet Online, Jun. 14, 2002, pp. 1-3.
Kramer, "NETWATCH; The AJC's Daily Online Guide; Get the picture: Kodak will send photos to Web," The Atlanta Journal and Consitution, Sec. Features, p. 08C, Jun. 5, 1997.
Lampson et al., "Authentication in Distributed Systems: Theory and Practice," ACM Transactions n Computer Systems, vol. 10, No. 4, Nov. 1992, pp. 265-310.
Lansky, "Without APS, Photo Life Goes on Via Internet," Photographic Trade News, Aug. 1996, pp. 19-23.
Lewis, "Pacific Bell, MCI to Expand Internet Service," The New York Times, sec. D, col. 1 at 3, Mar. 28, 1995.
LightSurf Instant Imaging—Press Releases, "Kodak and LightSurf Collaborate On Kodak Picture Center Online," LifeSurf Technologies Inc., Jun. 14, 2002, pp. 1-3.
Louwerse et al., "Data Protection Aspects in an Integrated Hospital Information System," North-Holland Computers & Security 3, 1984, pp. 286-294.
McEnaney, "Point-and-Click Memory Sharing; Launches PhotoNet online digital photography and imaging services," Photographic Trade News, Sec. p. 23, Jan. 1997.
Miller, "Web posting as a photo processing option," USA Today, Section: Life, p. 17D, Dec. 13, 1996.
Morris et al., "Andrew: A Distributed Personal Computing Environment," Communications of the ACM, vol. 29, No. 3, Mar. 1986, pp. 184-201.
O'Mahony, "Security Considerations in a Network Management Environment," IEEE NEtwork, May/Jun. 1994, pp. 12-17.
Oppen et al., "The Clearinghouse: A Decentralized Agent for Locating Names Objects in a Distributed Environment," ACM Transactions on Office Information Systems, vol. 1, No. 3, Jul. 1983, pp. 230-253.
Petersen, "New But Not Improved," Direct Magazine, Nov. 1995.
Press Release, "Sun Goes Live With The Kodak Picture Network," Sun Microsystems, Inc., Jun. 14, 2002, pp. 1-2.
Raeder, "Is there a Prodigy in your future?," Database Searcher, vol. 5, No. 6, p. 18.
Ramm et al., "Exu—A System for Secure Delegation of Authority on an Insecure Network," Ninth System Administration Conference, 1995 LISA IX, Sep. 17-22, 1995, pp. 89-93.
Satyanarayanan, "Integrating Security in a Large Distributed System," ACM Transactions on Computer Systems, vol. 7, No. 3, Aug. 1989, pp. 247-280.
Schroeder et al., "Experience with Grapevine: The Growth of a Distributed System," ACM Transactions on Computer Systems, vol. 2, No. 1, Feb. 1984, pp. 3-23.

Senn, "Capitalizing on Electronic Commerce: The Role of the Internet in Electronic Markets," Information Systems Management, Summer 1996, pp. 15-24.

Steinke, "Design Aspects of Access Control in a Knowledge Base System," Computers & Security, 10, 1991, pp. 612-625.

Stern, "Industry Net," Link-Up, Mar./Apr. 1995, p. 10.

Tanenbaum et al., "Distributed Operating Systems," Computing Surveys, vol. 17, No. 4, Dec. 1985, pp. 419-470.

The Wall Street Journal, "Barclays Is Opening An 'Electronic Mail' For Internet Shopping," Tech. & Health Section at B2, Jun. 1, 1995.

The Wall Street Journal, "Prodigy Plans to Announce Internet 'Electronic Mail'," Tech. Section at B5, Nov. 27, 1995.

Trommer, "Thomas Unveils Online Purchasing Network—Eases Product Sourcing And Ordering Through EDI," Electronic Buyers'News at 60, Dec. 11, 1995.

Van Den Berg et al., "Advanced Topics of a Computer Center Audit," North-Holland Computers & Security 3, 1984, pp. 171-185.

Van Der Lans, "Data Security in a Relational Database Environment," North-Holland Computers & Security 5, 1986, pp. 128-134.

Welz, "New Deals: A ripening Internet market, secure systems and digital currency are reshaping global commerce," Internet World, Jun. 1995, pp. 36-41.

Wobber et al., "Authentication in the Taos Operating System," ACM, 1993, pp. 256-269.

Wyatt, "Netscape Enterprise Server," Prima Publishing, 1996.

"Eden Project Proposal," Department of Computer Science, University of Washington, Oct. 1980, Technical Report #80-10-01, cover and Foreword.

Almes et al., "Edmas: A Locally Distributed Mail System," Department of Computer Science, University of Washington, Technical Report 83-07-01, Jul. 7, 1983, Abstract & pp. 1-17.

Almes et al., "Research in Integrated Distributed Computing," Department of Computer Science, University of Washington, Oct. 1979, pp. 1-42.

Almes et al., "The Eden System: A Technical Review," Department of Computer Science, University of Washington, Technical Report 83-10-05, Oct. 1983, pp. 1-25.

Almes, "Integration and Distribution in the Eden System," Department of Computer Science, University of Washington, Technical Report 83-01-02, Jan. 19, 1983, pp. 1-18 & Abstract.

Almes, "The Evolution of the Eden Invocation Mechanism," Department of Computer Science, University of Washington, Technical Report 83-01-03, Jan. 19, 1983, pp. 1-14 & Abstract.

Arnold, Ken, "The Jini Architecture: Dynamic Services in a Flexible Network," Sun Microsystems, Inc., Proceedings of the 36th ACM IEEE Design Automation Conference, Jun. 1999, pp. 157-162.

Begole et al., "Transparent Sharing of Java Applets: A Replicated Approach," Oct. 1997, pp. 55-65.

Black et al., "A Language for Distributed Programming," Department of Computer Science, University of Washington, Technical Report 86-02-03, Feb. 1986, p. 10.

Black et al., "Distribution and Abstract Types in Emerald," University of Washington, Technical Report No. 85-08-05, Aug. 1985, pp. 1-10.

Black et al., "Object Structure in the Emerald System," University of Washington, Technical Report 86-04-03, Apr. 1986, pp. 1-14.

Black et al., "The Eden Project: A Final Report," Department of Computer Science, University of Washington, Technical Report 86-11-01, Nov. 1986, pp. 1-28.

Black, "Supporting Distributed Applications: Experience with Eden," Department of Computer Science, University of Washington, Technical Report 85-03-02, Mar. 1985, pp. 1-21.

Black, "The Eden Programming Language," Department of Computer Science, FR-35, University of Washington, Technical Report 85-09-01, Sep. 1985 (Revised Dec. 1985), pp. 1-19.

Black, "The Eden Project: Overview and Experiences," Department of Computer Science, University of Washington, EUUG, Autumn '86 Conference Proceedings, Manchester, UK, Sep. 22-25, 1986, pp. 177-189.

Braine et al., "Object-Flow," 1997, pp. 418-419.

Ciancarini et al., "Coordinating Distributed Applets with Shade/Java," Feb. 1998, pp. 130-138.

Delcambre et al., "Simulation of the Object Flow Model: A Conceptual Modeling Language for Object-Driven Applications," 1993, pp. 216-225.

Goldberg et al., "Smalltalk-80—The Language and its Implementation," Xerox Palo Alto Research Center, 1983 (reprinted with corrections, Jul. 1985), pp. 1-720.

Holman et al., "The Eden Shared Calendar System," Department of Computer Science, FR-35, University of Washington, Technical Report 85-05-02, Jun. 22, 1985, pp. 1-14.

Hsu, "Reimplementing Remote Procedure Calls," University of Washington, Thesis, Mar. 22, 1985, pp. 1-106.

Hutchinson, "Emerald: An Object-Based Language for Distributed Programming," a Dissertation, University of Washington, 1987, pp. 1-107.

Jacob, "The Use of Distributed Objects and Dynamic Interfaces in a Wide-Area Transaction Environment," SIGCOMMn '95 Workshop on Middleware: Cambridge, Mass., Aug. 1995, pp. 1-3.

Jul et al., "Fine-Grained Mobility in the Emerald System," University of Washington, ACM Transactions on Computer Systems, vol. 6, No. 1, Feb. 1988, pp. 109-133.

Jul, "Object Mobility in a Distributed Object-Oriented System," a Dissertation, University of Washington, 1989, pp. 1-154 (1 page Vita).

Koshizuka et al., "Window Real-Objects: A Distributed Shared Memory for Distributed Implementation of GUI Applications," Nov. 1993, pp. 237-247.

Krasner et al., "Smalltalk-80: Bits of History, Words of Advice," 1983, Xerox Corporation, pp. 1-344.

Lavana et al., "Executable Workflows: A Paradigm for Collaborative Design on the Internet," Jun. 1997, 6 pages.

Proceedings of the Eighth Symposium on Operating Systems Principles, Dec. 14-16, 1981, ACM, Special Interest Group on Operating Systems, Association for Computing Machinery, vol. 15, No. 5, Dec. 1981, ACM Order No. 534810.

Proudfoot, "Replects: Data Replication in the Eden System," Department of Computer Science, University of Washington, Technical Report No. TR-85-12-04, Dec. 1985, pp. 1-156.

Pu, "Replication and Nested Transaction in the Eden Distributed System," Doctoral Dissertation, University of Washington, Aug. 6, 1986, pp. 1-179 (1 page Vita).

Trehan et al., "Toolkit for Shared Hypermedia on a Distributed Object Oriented Architecture," 1993, pp. 1-8.

Hodges, D., "Managing Object Lifetimes in OLE", pp. 1-41.

Aldrich et al., "Providing Easier Access to Remote Objects in Client-Server Systems," System Sciences, 1998, Proceedings of the 31st Hawaii Internat'l. Conference, Jan. 6-9, 1998, pp. 366-375.

Aldrich et al., "Providing Easier Access to Remote Objects in Distributed Systems," Calif. Institute of Technology, www.cs.caltech.edu/%7Ejedi/paper/jedipaper.html, Nov. 21, 1997.

Burns et al., "An Analytical Study of Opportunistic Lease Renewal,"Distributed Computing Systems, 21st International Conference, pp. 146-153, Apr. 2000.

Dollimore et al., "The Design of a System for Distributing Shared Objects," The Computer Journal, No. 6, Cambridge, GB, Dec. 1991.

Fleisch et al., "High Performance Distributed Objects Using Distributed Shared Memory & Remote Method Invocation," System Sciences, 1998, Proceedings of the 31st Hawaii Internat'l. Conference, Jan. 6-9, 1998, pp. 574-578.

Guyennet et al., "A New Consistency Protocol Implemented in the CAliF System," IEEE, 1094-7256/97, pp. 82-87, 1997.

Guyennet et al., "Distributed Shared Memory Layer for Cooperative Work Applications," IEEE, 0742-1303/97, pp. 72-78, 1997.

Hoshi et al., "Allocation of the Cross-Connect Function in Leased Circuit Networks," 1992, ICC'92, conference record, SUPERCOMM/ICC '92, A New World of Communications, IEEE International Conference, pp. 1408-1412.

IBM Technical Disclosure Bulletin, "Local Network Monitoring to Populate Access Agent Directory," vol. 36, No. 09A, pp. 403-405, Sep. 1993.

McGrath, "Discovery and Its Discontents: Discovery Protocols for Ubiquitous Computing," Presented at Center for Excellence in Space Data and Information Science, NASA Goddard Space Flight Center, Apr. 5, 2000.

Mitchell et al., "Mesa Language Manual," Xerox Corporation, Palo Alto Research Center, 1978.

MUX-Elektronik, Java 1.1 Interactive Course, www.lls.se/~mux/javaic.html, 1995.

Stevenson, "Token-Based Consistency of Replicated Servers," IEEE, CH2686-4/89/0000/0179, pp. 179-183, 1989.

Wollrath et al., "A Distributed Object Model for the Java (TM) System," USENIX Association, Conference on Object-Oriented Technologies and Systems, Jun. 17-21, 1996.

Yin et al., "Volume Leases for Consistency in Large-Scale Systems," IEEE Transactions on Knowledge & Data Engineering, vol. 11, No. 4, pp. 563-576, Jul./Aug. 1999.

"Java (TM) Remote Method Invocation Specification," Sun Microsystems, Inc., <java.sun.com/products/jdk1.2beta1>, 1997.

"Transparent Network Computing," Locus Computing Corporation, Jan. 5, 1995.

Agha et al., "Actorspaces: An Open Distributed Programming Paradigm," University of Illinois, Report No. UIUCDCS-R-92-1766, Open Systems Laboratory TR No. 8, pp. 1-12, Nov. 1992.

Ahmed et al., "A Program Building Tool for Parallel Applications," Yale University, pp. 1-23, Dec. 1, 1993.

Alexander et al., "Active Bridging," Proceedings of the ACM/SIGCOMM'97 Conference, Cannes, France, Sep. 1997.

Anderson et al., "Persistent Linda: Linda + Transactions + Query Processing," Proceedings of the 13th Symposium on Fault Tolerant Systems, pp. 93-109, 1991.

Anonymous, "Change-Notification Service for Shared Files," IBM Technical Disclosure Bulletin, vol. 36, No. 8, pp. 77-82, XP002108713, New York, US, Aug. 1993.

Anonymous, "Resource Preemption for Priority Scheduling," IBM Technical Disclosure Bulletin, vol. 16, No. 6, p. 1931, XP002109435 New York, US, Nov. 1973.

Beech et al., "Object Databases as Generalizations of Relational Databases," Computer Standards & Interfaces, vol. 13, Nos. 1/3, pp. 221-230, Amsterdam, NL, Jan. 1991.

Bertino et al., "Object-Oriented Database Managment Systems: Concepts and Issues," Computer, vol. 24, No. 4, pp. 33-47, Los Alamitos, CA, Apr. 1991.

Betz et al., "Interoperable Objects: Laying the Foundation for Distributed Object Computing," Dr. Dobb's Journal, vol. 19, No. 11, p. 18(13), Oct. 1994.

Bevan et al., "An Efficient Reference Counting Solution To The Distributed Garbage Collection Problem," Parallel Computing, NL, Elsevier Science Publishers, Amsterdam, vol. 9, No. 2, pp. 179-192, Jan. 1989.

Birrell et al., "Distributed Garbage Collection for Network Objects," Digital Systems Research Center, No. 116, pp. 1-18, Dec. 15, 1993.

Birrell et al., "Grapevine: An Exercise in Distributed Computing," Communications of the ACM, vol. 25, No. 4, pp. 260-274, Apr. 1982.

Birrell et al., "Implementing Remote Procedure Calls," ACM Transactions on Computer Systems, vol. 2, No. 1, pp. 39-59, Feb. 1984.

Birrell et al., "Network Objects," DEC SRC Research Report 115, Feb. 28, 1994.

Birrell et al., "Network Objects," Operating Systems Review, 27(5), pp. 217-230, Dec. 1993.

Cannon et al., "Adding Fault-Tolerant Transaction Processing to LINDA," Software-Practice and Experience, vol. 24(5), pp. 449-466, May 1994.

Cardelli, "Obliq, A Lightweight Language For Network Objects," Digital SRC, pp. 1-37, Nov. 5, 1993.

Carriero et al., "Distributed Data Structures in Linda," Principles of Programming Language, pp. 1-16, 1986.

Carriero et al., "Distributed Data Structures in Linda," Yale Research Report YALEU/DSC/RR-438, Nov. 1985.

Chung et al., "A 'Tiny' Pascal Compiler: Part 1: The P-Code Interpreter," BYTE Publications, Inc., Sep. 1978.

Chung et al., "A 'Tiny' Pascal Compiler: Part 2: The P-Compiler," BYTE Publications, Inc., Oct. 1978.

Coulouris et al., "Distributed Systems Concepts and Designs," Second Edition, Addison-Wesley, 1994.

Dave et al., "Proxies, Application Interface, And Distributed Systems," Proceedings International Workshop On Object Orientation In Operating Systems, pp. 212-220, Sep. 24, 1992.

Deux et al., "The O2 System," Communications Of The Association For Computing Machinery, vol. 34, No. 10, pp. 34-48, Oct. 1, 1991.

Dijkstra, "Self-stabilizing Systems in Spite of Distributed Control," Communications of the ACM, vol. 17, No. 11, pp. 643-644, Nov. 1974.

Dolev et al., "On the Minimal Synchronism Needed for Distributed Consensus," Journal of the ACM, vol. 34, No. 1, pp. 77-97, Jan. 1987.

Dourish, "A Divergence-Based Model of Synchrony and Distribution in Collaborative Systems," Xerox Technical Report EPC-1194-102, pp. 1-10, 1994.

Drexler et al., "Incentive Engineering for Computational Resource Management," The Ecology of Computation, Elsevier Science Publishers B.V., pp. 231-266, 1988.

Droms, "RFC 1541 Dynamic Host Configuration Protocol," <http://www.cis.ohio-state.edu/htbin/rfc/rfc1541.html>, pp. 1-33, Oct. 1993.

Emms, "A Definition Of An Access Control Systems Language," Computer Standards And Interfaces, vol. 6, No. 4, pp. 443-454, Jan. 1, 1987.

Gelernter et al., "Parallel Programming in Linda," Yale University, pp. 1-21, Jan. 1985.

Gelernter, "Generative Communication in Linda," ACM Transactions on Programming Languages and Systems, vol. 7, No. 1, pp. 80-112, Jan. 1985.

Gosling et al., "The Java (TM) Language Specification," Addison-Wesley, 1996.

Gottlob et al., "Extending Object-Oriented Systems with Roles," ACM Transactions On Information Systems, vol. 14, No. 3, pp. 268-296, Jul. 1996.

Gray et al., "Leases: An Efficient Fault-Tolerant Mechanism for Distributed File Cache Consistency," ACM, pp. 202-210, 1989.

Guth, "JavaOne: Sun to Expand Java Distributed Computing Effort," <http://www.sunworld.com/swol-02-1998/swol-02-sunspots.html>, XP-002109935, P. 1, Feb. 20, 1998.

Hamilton et al., "Subcontract: A Flexible Base For Distributed Programming," Proceedings of 14th Symposium of Operating System Principles, Dec. 1993.

Hamilton, "Java and the Shift to Net-Centric Computing," Computer, pp. 31-39, Aug. 1996.

Harris et al., "Proposal for a General Java Proxy Class for Distributed Systems and Other Uses," Netscape Communications Corp., Jun. 25, 1997.

Hartman et al., "Liquid Software: A New Paradigm For Networked Systems," Technical Report 96-11, Department of Comp. Sci., Univ. of Arizona, Jun. 1996.

Howard et al., "Scale and Performance in a Distributed File System," ACM Transactions on Computer Systems, vol. 6, No. 1, pp. 51-81, Feb. 1988.

Hunt, "IDF: A Graphical Data Flow Programming Language for Image Processing and Computer Vision," Proceedings of the International Conference on Systems, Man, and Cybernetics, pp. 351-360, Los Angeles, Nov. 4-7, 1990.

IBM (TM) Technical Disclosure Bulletin, "Object Location Algorithm," vol. 36, No. 09B, pp. 257-258, Sep. 1993.

IBM (TM) Technical Disclosure Bulletin, "Retrieval of Qualified Variables Using Extendible Hashing," vol. 36, No. 12, pp. 301-303, Dec. 1993.

IBM, "Chapter 6—Distributed SOM (DSOM)," SOMobjects Developer Toolkit Users Guide, Version 2.1, pp. 6-1-6-90, Oct. 1994.

Jaworski, "Java 1.1 Developer's Guide, 2nd Edition," Sams.net, 1997.

Jones et al., "Garbage Collection: Algorithms for Automatic Dynamic Memory Management," pp. 165-175, John Wiley & Sons, 1996.

Kambhatia et al., "Recovery with Limited Replay: Fault-Tolerant Processes in Linda," Oregon Graduate Institute, Technical Report CSIE 90-019, pp. 1-16, Sep. 1990.

Kay et al., "An Overview of the Raleigh Object-Oriented Database System," ICL Technical Journal, vol. 7, No. 4, pp. 780-798, Oxford, GB, Nov. 1991.

Kougiouris et al., "Support for Space Efficient Object Invocation in Spring," Sep. 1994.

Krasner, "The Smalltalk-80 Virtual Machine," BYTE Publications Inc., pp. 300-320, Aug. 1991.

Lamport et al., "The Byzantine Generals Problem," ACM Transactions on Programming Languages and Systems, vol. 4, No. 3, pp. 382-401, Jul. 1982.

LINDA Database Search, pp. 1-68, Jul. 20, 1995.

Lindholm et al., "The Java (TM) Virtual Machine Specification," Addison Wesley, 1996.

Liskov et al., "Distributed Object Management in Thor," International Workshop on Distributed Object Management, p. 12, 1992.

McDaniel, "An Analysis of a Mesa Instruction Set," Xerox Corporation, May 1982.

Mitchell et al., "An Overview of the Spring System," Feb. 1994.

Mullender, "Distributed Systems," Second Edition, Addison-Wesley, 1993.

Mummert et al., "Long Term Distributed File Reference Tracing: Implementation and Experience," Carnegie Mellon University School of Computer Science, pp. 1-28, Nov. 1994.

Orfali et al., "The Essential Distributed Objects Survival Guide," Chapter 11: Corba Commercial ORBs, pp. 203-215, John Wiley & Sons, Inc., 1996.

Ousterhout et al., "The Sprite Network Operating System," Computer, IEEE, pp. 23-36, Feb. 1988.

Pier, "A Retrospective on the Dorando, A High-Performance Personal Computer," IEEE Conference Proceedings, The 10th Annual International Symposium on Computer Architecture, 1983.

Pier, "A Retrospective on the Dorando, A High-Performance Personal Computer," Xerox Corporation, Aug. 1983.

Pinakis, "Using Linda as the Basis of an Operating System Microkernel," University of Western Australia, Department of Computer Science, pp. 1-165, Aug. 1993.

Riggs et al., "Pickling State in the Java (TM) System," USENIX Association Conference on Object-Oriented Technologies and Systems, XP-002112719, pp. 241-250, Jun. 17-21, 1996.

Rosenberry et al., "Understanding DCE," Chapters 1-3, 6, 1992.

Sharrott et al., "ObjectMap: Integrating High Performance Resources into a Distributed Object-oriented Environment," ICODP, 1995.

Thompson, "Regular Expression Search Algorithm," Communications of the ACM, vol. II, No. 6, p. 149 et seq., Jun. 1968.

Venners, "Jini Technology, Out of the Box," JAVAWORLD, Online!, pp. 1-4, Dec. 1998.

Waldo et al., "Events in An RPC Based Distributed System," Proceedings Of The 1995 USENIX Technical Conference, Proceedings USENIX Winter 1995 Technical Conference, New Orleans, LA, USA, 16-20, pp. 131-142, Jan. 1995.

Wilson et al., "Design of the Opportunistic Garbage Collector," Proceedings of the Object Oriented Programming Systems Languages And Applications Conference, New Orleans, vol. 24, No. 10, Oct. 1989.

Wu, "A Type System For An Object-Oriented Database System," Proceedings of the International Computer Software and Applications Conference (COMPSAC), Tokyo, Japan, pp. 333-338, Sep. 11-13, 1991.

Yemini et al., "Towards Programmable Networks," IFIP/IEEE International Workshop on Distributed Systems: Operations and Management, L'Aquila, Italy, Oct. 1996.

Yin et al., "Using Leases to Support Server Driven Consistency in Large-Scale Systems," Computer Services Department, University of Texas at Austin, p. 285-294, May 26-28, 1998.

Wollrath, A., et al., "A Distributed Object Model for the Java System," Second USENIX Conference on Object-Oriented Technologies (COOTS) Proceedings, 1996, pp. 219-232.

"Passing Proxies as Parameters to Methods and Return Values from Methods," IBM Technical Disclosure Bulletin, vol. 41, No. 1, Jan. 1998, pp. 89-92.

Subramanian, Sakthi et al., "Automatic Verification of Object Code Against Source Code," IEEE, 1996, pp. 46-55.

Wollrath, A., et al., "Simple Activation for Distributed Objects," USENIX Association, Conference on Object-Oriented Technologies (COOTS), Jun. 26-29, 1995 (11 pages).

Stoyenko, A.D. "SUPRA-RPC: Subprogram PaRAmeters in Remote Procedure Calls," *Software-Practice and Experience*, vol. 24(1), Jan. 1994, 27-49.

Li, Sing et al., "Professional Jini", Chapter 7, Aug. 2000.

Spiteri, M.D., et al., "An architecture to support storage and retrieval of events", 1998.

* cited by examiner

METHOD AND SYSTEM FOR PASSING OBJECTS IN A DISTRIBUTED SYSTEM USING SERIALIZATION CONTEXTS

FIELD OF THE INVENTION

The present invention relates generally to data processing systems and, more particularly, to passing serialized versions of objects in a distributed system.

BACKGROUND OF THE INVENTION

Distributed systems can be made up of various components, including both hardware and software. A distributed system (1) allows its users to share services and resources over a network of many devices; (2) provides programmers with tools and programming patterns that allow development of robust, secured distributed systems; and (3) simplifies the task of administering the distributed system.

A distributed system can be implemented using an object-oriented programming language, such as Java™. The Java™ programming language is typically compiled into a platform-independent format, using a bytecode instruction set, which can be executed on any platform supporting the Java™ virtual machine. The Java™ programming language is described in greater detail in *The Java™ Language Specification* by James Gosling, Bill Joy, and Guy Steele, Addison-Wesley, 1996, which is incorporated herein by reference. Java™ and Jave-based trademarks are trademarks or registered trademarks of Sun Microsystems, Inc. in the United States and other countries.

Distributed systems require that programs running in different address spaces be able to communicate with each other. In a system using an object-oriented programming language, such as the Java™ programming language, this communication can be achieved by passing an "object," which represents an item or instance manipulated by the system, from one program to another. In such a system, a "class" provides a template for the creation of objects having characteristics of that class. The objects in each class share certain characteristics or attributes determined by the class. A class thus defines the type of an object. Objects are typically created dynamically during system operation. Methods associated with a class are generally invoked on the objects of the same class or subclass.

In a Java™ distributed system, an object is referred to as being remote when its methods can be invoked from another address space, typically a Java™ virtual machine on a different computer. A remote object is described by one or more remote interfaces, which are Java™ interfaces that declare the methods of the remote object. Remote Method Invocation (RMI) is used to invoke a method of a remote interface on a remote object. RMI is explained in, for example, the Remote Method Invocation Specification, Sun Microsystems, Inc. (1997), which is incorporated herein by reference.

As part of RMI, Java™ objects are passed between a client and a server. Before being passed, a Java™ object is converted into a serialized representation of itself. The serialized representation of the object contains enough information to enable the recipient to identify and verify the Java™ class from which the contents of the object were saved and to restore the contents to a new instance. A serialized object contains two main parts: the object data and a class descriptor. The class descriptor describes the content and format of the object data.

When a serialized object is passed, the object data and the class descriptor are transmitted across the network. Although the object data may change over time, the class descriptor remains the same. Therefore, multiple remote method calls can result in passing the same class descriptor multiple times to a recipient who already has a copy of the class descriptor. This is expensive in terms of processing time as well as wasted network bandwidth. It is therefore desirable to reduce the number of times that a class descriptor is sent to a recipient.

SUMMARY OF THE INVENTION

Systems and methods consistent with the present invention reduce the number of redundant class descriptors that are sent during remote method calls by using serialization contexts. "Serialization contexts" are dictionary objects that map a class descriptor to a corresponding integer handle and, on the receiving end, map the integer handle back to the class descriptor. When possible, the integer handle, rather than the full class descriptor, is passed, saving processing time in RMI calls.

A method consistent with the present invention passes a first object and a second object, both instances of a class, in distinct remote method calls in a distributed system. The first object is passed from a sender to a recipient with a descriptor of the class and a handle corresponding to the descriptor. The handle and the descriptor are stored by the recipient. The second object is then passed from the sender to the recipient with the handle, and the recipient uses the handle to determine the descriptor.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION

A system consistent with the present invention reduces the number of redundant class descriptors that are sent during remote method calls by using serialization contexts. "Serialization contexts" are dictionary objects that map a class descriptor to a corresponding integer handle. When possible, the integer handle, rather than the full class descriptor, is passed, saving processing time in RMI calls.

Figure 1:
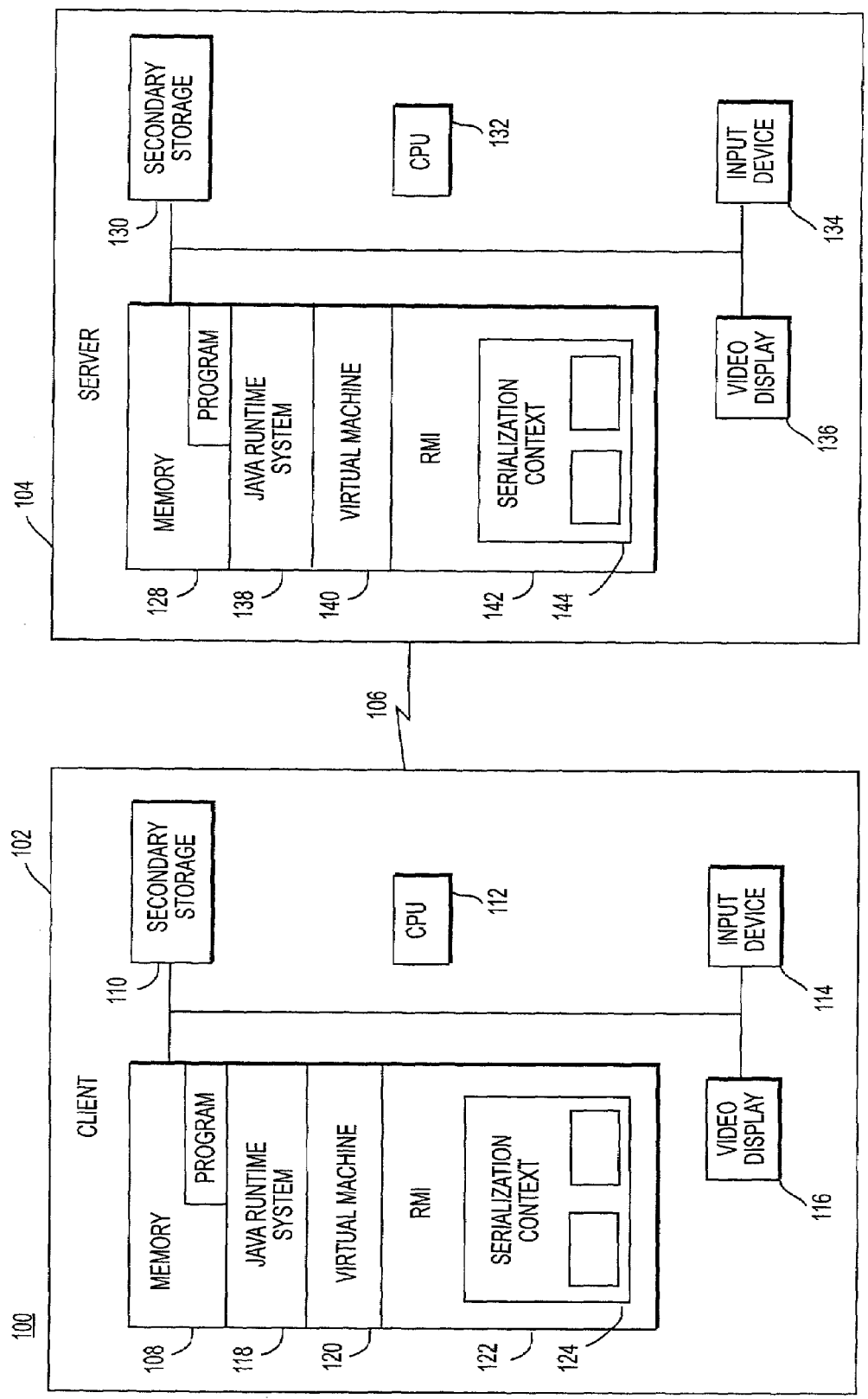
FIG. 1 depicts a distributed system 100 suitable for practicing methods and systems consistent with the present invention.

FIG. 1 depicts a distributed system 100 suitable for practicing methods and systems consistent with the present invention. Distributed system 100 includes client computer 102 and server computer 104, communicating via network 106. Network 106 may be, for example, a local area network, wide area network, or the Internet.

Client computer 102 includes a memory 108, a secondary storage device 110, a central processing unit (CPU) 112, an input device 114, and a video display 116. The memory 108 includes a Java™ runtime system 118. The Java™ runtime system 118 includes a Java™ virtual machine 120, and a Java™ remote method invocation (RMI) system 122. The RMI system 122 contains one or more serialization contexts 124. Memory 108 also includes a program 126 running on client computer 102.

Server computer 104 includes a memory 128, a secondary storage device 130, a central processing unit (CPU) 132 an input device 134, and a video display 136. The memory 128 includes a Java™ runtime system 138. The Java™ runtime system 138 includes a Java™ virtual machine 140, and the Java™ remote method invocation (RMI) system 142. The RMI system 142 contains one or more serialization contexts 144. Memory 128 also includes a program 146 running on server computer 104, and one or more objects 148.

Using RMI, objects can be passed between client computer 102 and server computer 104. For example, a program 146 running on client computer 102 can invoke a method on an object 148 stored in the memory 130 of server computer 104. Client computer 102 would use RMI system 122 to convert the method call, including an identification of the remote method and any parameters, into a byte stream that is sent to server computer 104 via network 106. Server computer 104, upon receiving the byte stream, would use its RMI system to convert the byte stream into executable bytecode and initiate the invocation of the method on the remote object. If the method results in a return value, server computer 104 would convert the return value to a byte stream using its RMI system, and transmit the byte stream to the client computer 102.

The byte streams contain serialized versions of Java™ objects, e.g. parameters or return values. A serialized object contains two main parts: the object data and a class descriptor. The class descriptor describes the content and format of the object data. Object serialization is explained in, for example, the Java™ Object Serialization Specification, which is incorporated herein by reference.

Within a single remote method call, a class descriptor is sent with the first object of that type that is serialized, subsequent objects of that type in the same remote method call refer to the class descriptor with a "back reference" (i.e., an integer handle).

Serialization Contexts

In a serialized object, the class descriptor provides the full name of the class and its serialization ID, which uniquely identifies the class. The serialization ID is a 64-bit hash of the class name, interface class names, methods, and fields. Each class descriptor is an instance of the Java™ class ObjectStreamClass, defined as follows:

```
public class ObjectStreamClass
{
    public static ObjectStreamClass lookup(Class cl);
    public String getName( );
    public Class forClass( );
    public ObjectStreamField[ ] getFields( );
    public long getSerialVersionUID( );
    public String toString( );
}.
```

Serialization contexts can be used to pass the class descriptors of serialized objects. As explained above, serialization contexts are dictionary objects that map a class descriptor to a corresponding integer handle. When possible, the integer handle, rather than the full class descriptor, is passed, saving processing time in RMI calls.

Figure 2:
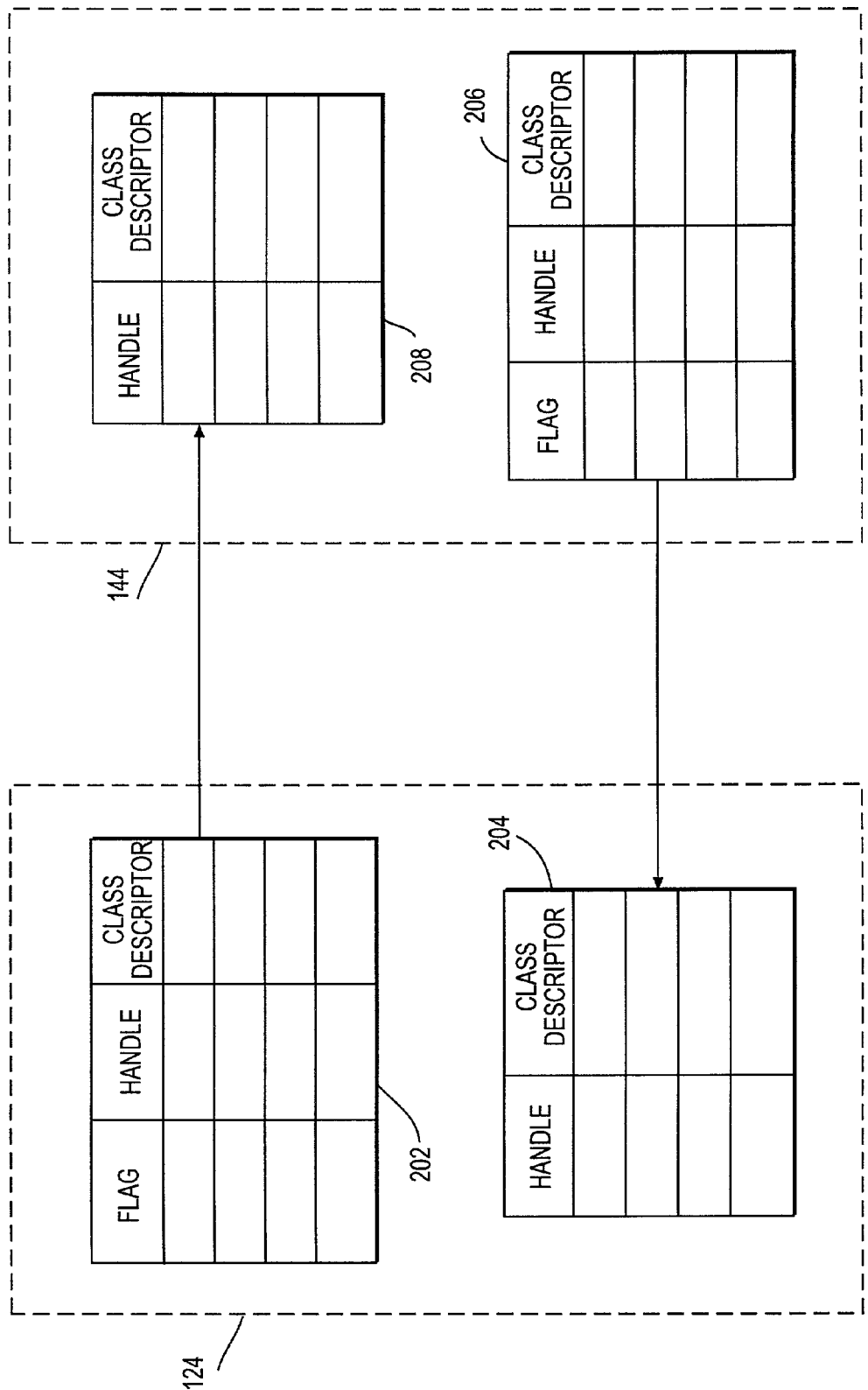
FIG. 2 is a block diagram showing two serialization contexts consistent with the present invention.

FIG. 2 is a block diagram showing serialization contexts 124 and 144 in more detail, consistent with the present invention. Each serialization context is maintained as a pair of tables: one for outgoing handles, e.g., 202 or 206, and one for incoming handles, e.g., 204 or 208. Outgoing handles are used when a program running on the computer acts as a sender (e.g., makes a remote call or sends return values). Incoming handles are used when a program running on the computer acts as a recipient (e.g., receives a remote call or receives return values). In this way, a program 126 running on the client computer and a program 146 running on the server computer can each act as a sender or recipient. Both the RMI system of the client computer and the RMI system of the server computer maintain an outgoing handle table and an incoming handle table.

RMI system 122 of client computer 102 contains serialization context 124, which consists of outgoing handle table 202 and incoming handle table 204, and RMI system 142 of server computer 104 contains serialization context 144, which consists of outgoing handle table 206 and incoming handle table 208. Each incoming handle table has one or more entries including a handle and a class descriptor. Each outgoing handle table has one or more entries, the entries including a flag, a handle, and a class descriptor. The flag in each outgoing handle table entry is a boolean value indicating whether the corresponding handle/class descriptor pair is "committed." If a handle/class descriptor pair in an outgoing handle table is committed, it is known to be saved in the corresponding incoming handle table of the serialization context pair. For example, if the committed flag in an entry in outgoing handle table 202 is true, then the corresponding class descriptor/handle pair has been stored in incoming handle table 208. If the committed flag is false, incoming handle table 208 may or may not contain the corresponding class descriptor/handle pair. The use of the committed flag will be described in further detail below with reference to FIG. 5.

Figure 3:
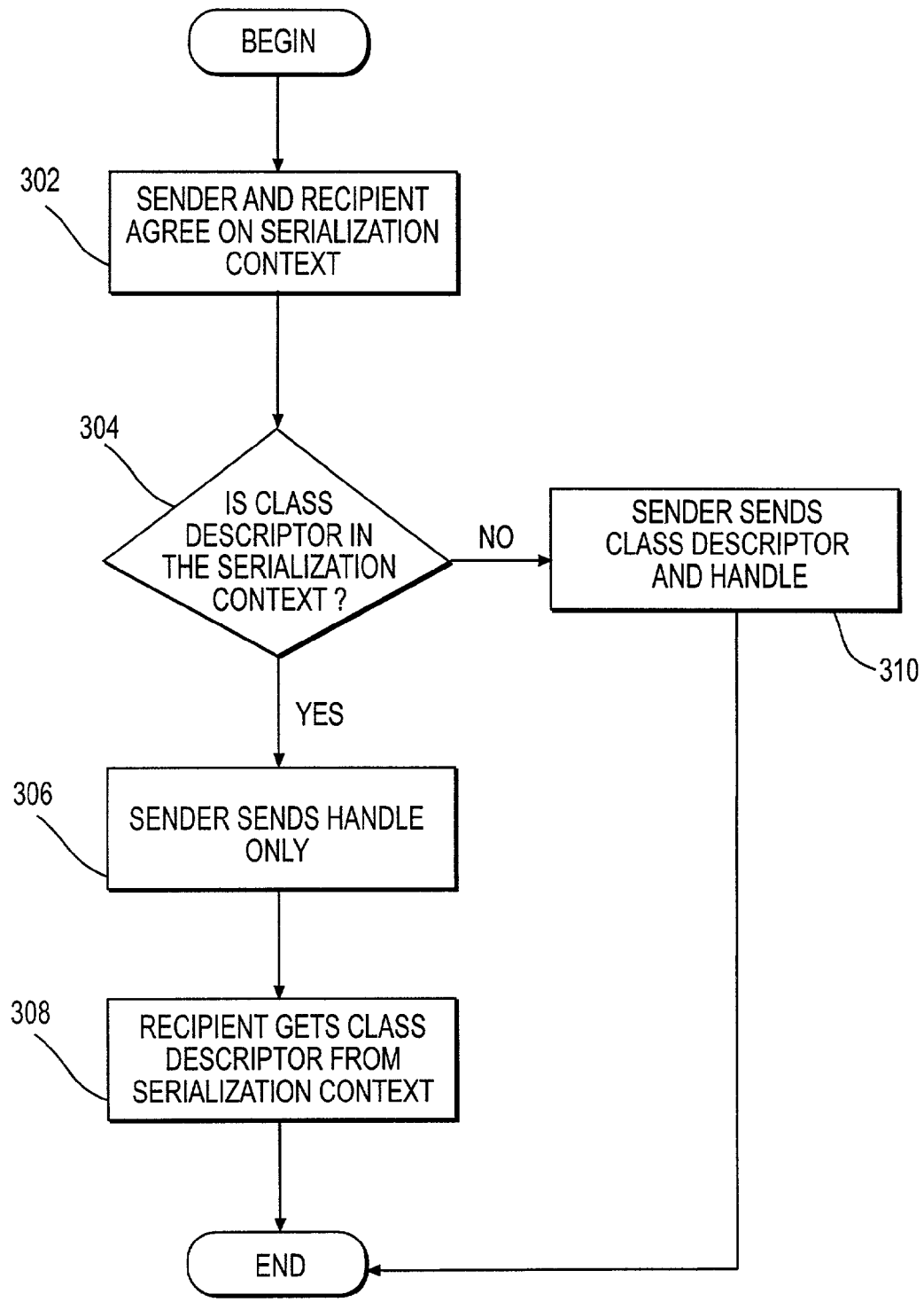
FIG. 3 depicts a flow chart of a method for passing objects using serialization contexts, consistent with the present invention.

FIG. 3 depicts a flow chart of a method for passing objects using serialization contexts, consistent with the present invention. First, the sender (e.g., program 126 running on client computer 102) and the recipient (e.g., program 146 running on server computer 104) agree on a serialization context to use during the method call (step 302). As a result of this agreement, or "handshake," the sender will use serialization context 124 and the recipient will use serialization context 144, as shown in FIG. 2. The "handshake" process is explained below, with reference to FIG. 4.

When the sender wishes to send a class descriptor to the recipient, the sender checks to see if the descriptor is already defined in the outgoing handle table 202 of serialization context 124 (step 304). If so, and if the committed flag is true, as detailed with reference to one embodiment in FIG. 5 below, the sender retrieves the handle corresponding to the class descriptor from the outgoing handle table 202 of serialization context 124, and sends the handle rather than the full class descriptor to the recipient (step 306). The recipient then uses the handle to look up the class descriptor in the incoming handle table 208 of serialization context 144. If the class descriptor that the sender wishes to send is not in the outgoing handle table 202 of serialization context 124, the sender sends both the class descriptor and a new handle (step 310). For subsequent calls, the sender can send just the handle to the recipient.

Handshake

Figure 4:
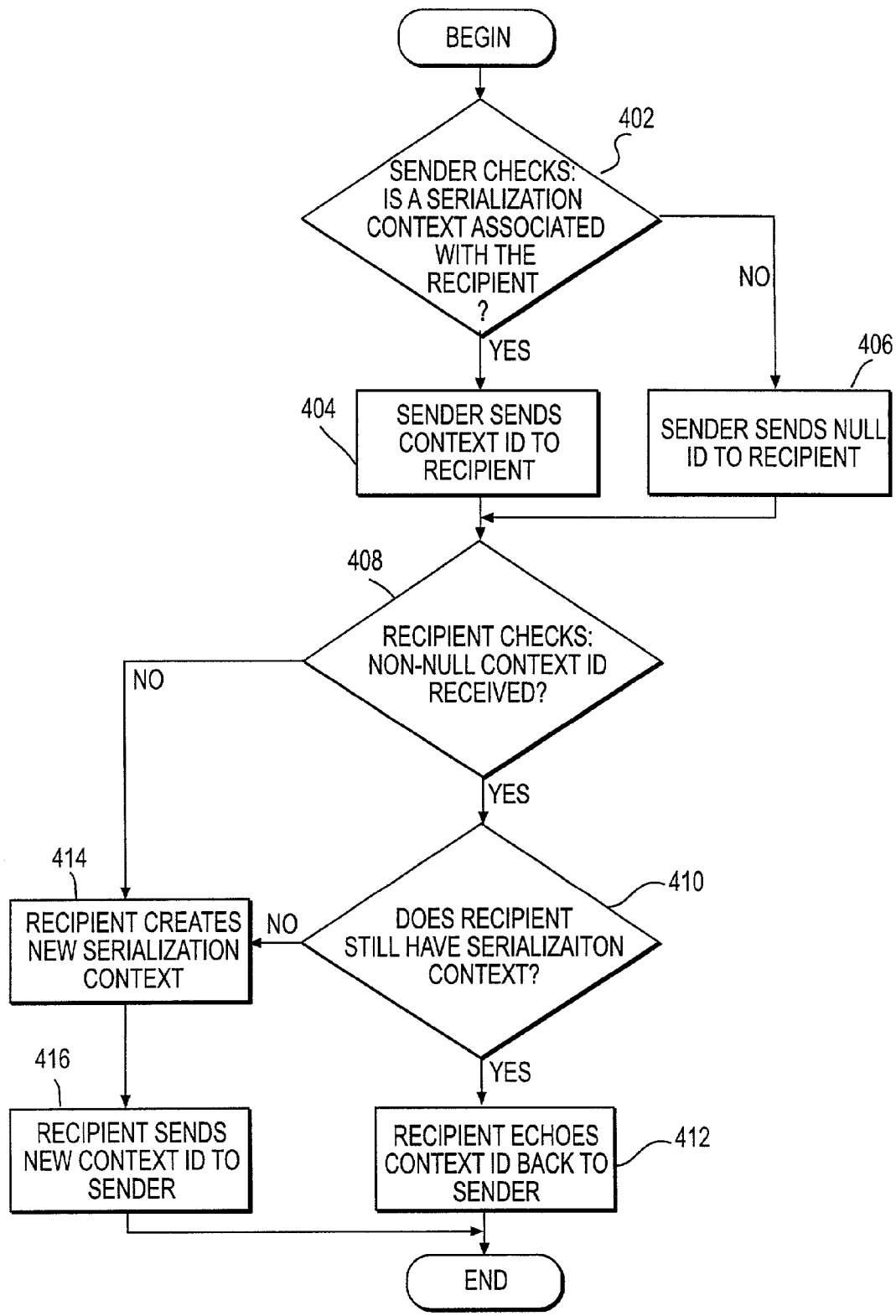
FIG. 4 is a flow chart of the "handshake" between a sender and a recipient to agree on a serialization context pair to use.

FIG. 4 is a flow chart of the "handshake" between a sender and a recipient to agree on a serialization context pair to use. When a connection between the sender and the recipient is established, e.g., when a new RMI session begins, the sender and recipient "handshake" to agree on a serialization context pair to use, as stated in step 302 of FIG. 3 above. Each pair of serialization contexts, e.g., serialization contexts 124 and 144, is identified by a globally unique context ID. This context ID is used to perform the handshake. First, the sender determines whether one of the sender's serialization contexts is associated with a serialization context of the recipient (step 402). If so, the sender transmits the context ID for that serialization context pair to the recipient (step 404). Otherwise, the sender transmits a null ID to the recipient (step 406). If the recipient receives a non-null context ID (step 408), it check to see if it still has the corresponding serialization context (step 410). If it does, the recipient echoes the context ID back to the sender (step 412).

If the recipient does not have the serialization context corresponding to the context ID received, or if the recipient receives a null ID, the recipient creates a new serialization context (step 414) and sends the new context ID to the sender (step 416). The sender then knows that, if it receives the same context ID that it sent, it can use the proposed serialization context. Otherwise, the sender should create a new serialization context with the new context ID and use that instead.

Using Committed Flags to Enhance Two-Way Communications

Figure 5:
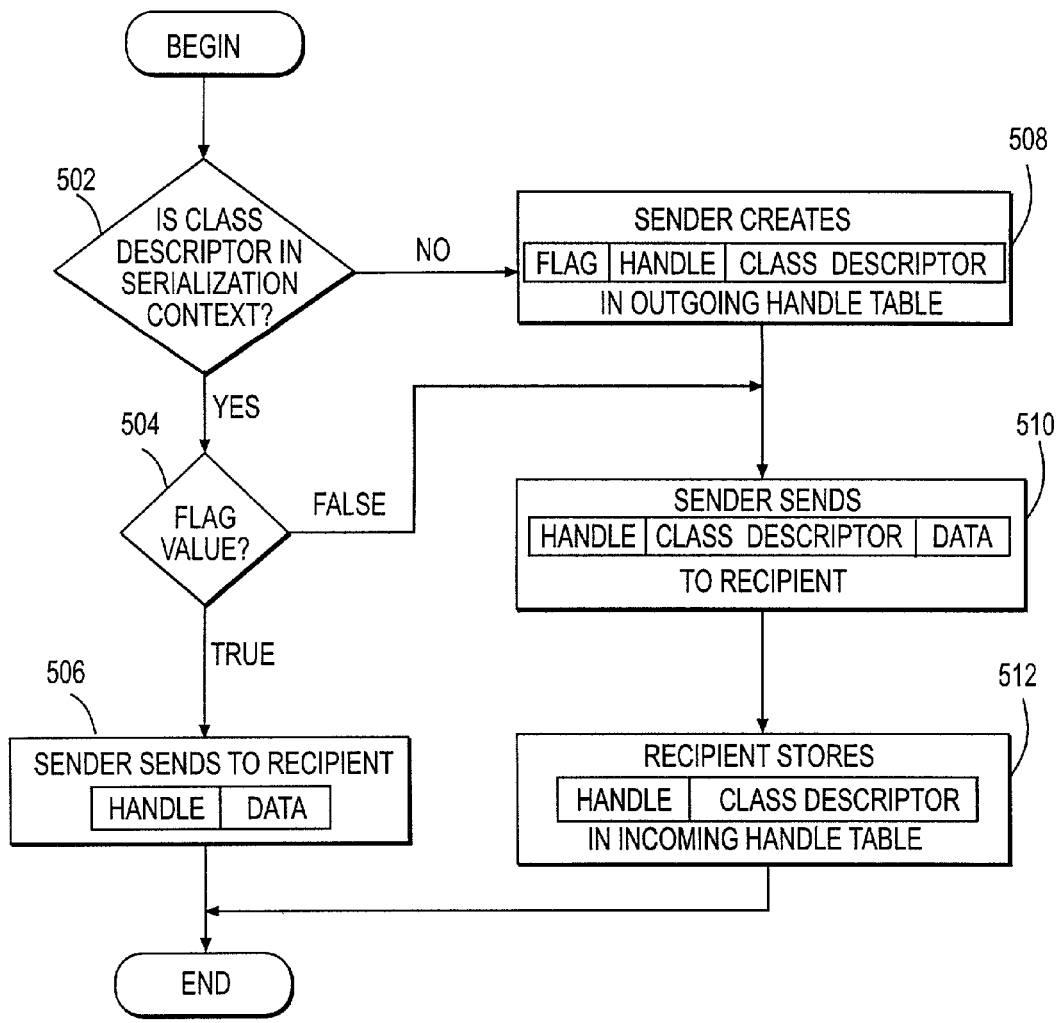
FIG. 5 is a flow chart showing how the committed flag can be used to provide two-way communication.

FIG. 5 is a flow chart showing how the committed flag can be used to enhance two-way communication by ensuring that handles are sent without class descriptor definitions only when the receiving end is known to have previously received a definition (i.e., a class descriptor) corresponding to the handle. As described in step 306 of FIG. 3 above, when the sender determines that a class descriptor is already defined in outgoing handle table 202, the sender can send the corresponding handle, rather than the full class descriptor, to the recipient. However, before sending the handle, the sender can use the committed flag to ensure that the sender has an entry containing the class descriptor/handle pair in incoming handle table 208.

To use the committed flag in this way, the sender first checks to see if the class descriptor is in the outgoing handle table 202 of serialization context 124 (step 502). If so, then the sender checks the value of the corresponding committed flag (step 504). If the committed flag is true, the sender can send the handle, knowing that the class descriptor/handle pair is stored in the recipient's incoming handle table 208 (step 506).

If the class descriptor is not in the outgoing handle table 202 of serialization context 124, the sender creates a new entry, with a new handle and a committed flag set to false, in outgoing handle table 202 (step 508) and sends the new handle and class descriptor to the recipient (step 510). The recipient stores the new class descriptor/handle pair in incoming handle table 208 (step 512). The sender would also send both the class descriptor and the handle to the recipient if the class descriptor is in outgoing handle table 202, but the committed flag is false (steps 510 & 512). The recipient would simply discard any duplicate handle/class descriptor pairs received.

Handle Acknowledgment-Arguments

To rely on the committed flags as described above, there must be a way to update the flags in both the sender's outgoing handle table and the recipient's outgoing handle table. This updating can be done using the arguments sent from the sender to the recipient and the return values returned from the recipient to the sender.

When an argument, including data and a class descriptor/handle pair, is sent from a sender (e.g., program 126 running on client computer 102) to a recipient (e.g., program 146 running on server computer 104), the recipient uses the class descriptor or handled to recreate the argument data and carry out the method call.

As part of this process, the recipient enters any new handle/class descriptor pairs into the incoming handle table 208. In one embodiment, this updating occurs before the method call can return successfully to the client. Therefore, when the remote method call is successfully returned to the original sender, the handle/class descriptor pair is implicitly acknowledged, and the sender can set the corresponding committed flag in the outgoing handle table 202 to true.

Handle Acknowledgment-Return Values

Class descriptors used by the recipient (e.g., program 126 running on server computer 104) to send return values to the sender (e.g., program 146 running on client computer 102) require an explicit acknowledgment. The recipient has no way of knowing whether the sender successfully stored the handle/class descriptor pair sent with the return value in the incoming handle table 204. To acknowledge that the incoming handle table 204 has been updated, the sender sends an explicit acknowledgment of its successful receipt of the handle/class descriptor pair with its next call to the recipient. The acknowledgment can be delayed in this way because the recipient only needs the acknowledgment if there are future communications between the sender and the recipient.

Garbage Collection

Serialization contexts can get quite large. If a pair of tables is no longer needed, memory space can be saved by deleting the tables. Preferably, this "garbage collection" is made possible by using the globally unique ID codes corresponding to each serialization context pair. A table that maps serialization contexts to their unique ID codes can be maintained by, for example, RMI system 124 or RMI system 144. Space in this table is "leased," meaning that after a set amount of time has passed, a serialization context/unique ID code pairing is deleted from the table. Each time a serialization context is accessed by an object, e.g., a program running on client computer 102 or server computer 104, the lease time is reset. Therefore, serialization contexts will automatically be available for a set amount of time between uses. After the set amount of time expires and a serialization context is deleted, a new table is created when a client wishes to communicate with the server, as described in FIG. 5.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method in a distributed system for passing a first object and a second object, wherein the first object and the second object are instances of a class, comprising the steps of:

passing the first object from a sender to a recipient with a descriptor of the class and a handle corresponding to the descriptor;

storing the handle and the descriptor received from the sender with the first object by the recipient;

passing the second object from the sender to the recipient with the handle;

using the handle received by the recipient with the second object to access the descriptor received by the recipient with the first object;

using the descriptor by the recipient to interpret the first object; and using the descriptor by the recipient to interpret the second object.

2. The method of claim 1, further comprising the step of: assigning, by the sender, the handle to the descriptor of the class.

3. The method of claim 1, further comprising the step of: assigning, by the recipient, the handle to the descriptor of the class.

4. The method of claim 1, further comprising the step of: creating a serialization context including the handle, the descriptor, and an indicator of whether the serialization context has been sent to the sender.

5. The method of claim 1, further comprising the step of: determining whether the class descriptor is accessible to the recipient.

6. A method in a distributed system for passing a first object and a second object to a recipient, wherein the first object and the second object are instances of a class, comprising the steps of:

passing, by a sender, the first object to the recipient with a descriptor of the class and a handle corresponding to the descriptor, whereupon receipt by the recipient, the recipient uses the descriptor to interpret the first object and stores the handle and the descriptor; and passing, by the sender, the second object to the recipient with the handle, whereupon receipt by the recipient, the recipient uses the handle received with the second object to access the descriptor of the class received with the first object and uses the descriptor to interpret the second object.

7. The method of claim 6, further comprising the step of: assigning the handle to the descriptor of the class.

8. The method of claim 6, further comprising the step of: creating a serialization context including the handle, the descriptor, and an indicator of whether the serialization context has been sent to the sender.

9. The method of claim 6, further comprising the step of: determining whether the class descriptor is accessible to the recipient.

10. A method in a distributed system for interpreting a first object and a second object, wherein the first object and the second object are instances of a class, comprising the steps of:

receiving the first object from a sender with a descriptor of the class and a handle corresponding to the descriptor;

storing the handle and the descriptor;

receiving the second object with the handle;

using the handle received with the second object to access the descriptor received with the first object;

using the descriptor by the recipient to interpret the first object; and using the descriptor by the recipient to interpret the second object.

11. The method of claim 10, further comprising the step of:

assigning the handle to the descriptor of the class.

12. A distributed system comprising:

a client computer, comprising:

a memory with a client program that sends a first object and a second object of a class to a remote location together with a handle corresponding to a descriptor of the class, and with an outgoing serialization context that stores the descriptor of the class and the handle corresponding to the descriptor; and a processor that runs the client program; and a server computer, comprising:

a memory with an incoming serialization context that stores the descriptor of the class and the handle received from the client computer with the first object, and with a server program that uses the descriptor of the class to interpret the first object, receives the second object from the client program, uses the handle received with the second object to access the descriptor of the class stored in the incoming serialization context, and uses the descriptor of the class to interpret the second object; and a processor that runs the server program.

13. A computer-readable medium containing instructions for controlling a data processing system to perform a method, the method for sending a first object and a second object from a source to a destination, wherein the first object and the second object are instances of a class, the method comprising the steps of:

sending the first object from the source to the destination with a descriptor of the class and a handle corresponding to the descriptor;

storing the handle and the descriptor received from the source by the destination;

using the descriptor by the destination to interpret the first object;

sending the second object from the source to the destination with the handle;

using the handle received by the destination with the second object to access the descriptor received by the destination with the first object; and using the descriptor to interpret the second object.

* * * * *